(12) United States Patent
Gahleitner et al.

(10) Patent No.: US 11,746,224 B2
(45) Date of Patent: Sep. 5, 2023

(54) HETEROPHASIC POLYPROPYLENE WITH PROPYLENE HEXENE RANDOM COPOLYMER AS MATRIX

(71) Applicant: BOREALIS AG, Vienna (AT)

(72) Inventors: Markus Gahleitner, Linz (AT); Jingbo Wang, Linz (AT); Klaus Bernreitner, Linz (AT); Pauli Leskinen, Porvoo (FI); Johanna Lilja, Porvoo (FI)

(73) Assignee: BOREALIS AG, Vienna (AT)

( * ) Notice: Subject to any disclaimer, the term of this patent is extended or adjusted under 35 U.S.C. 154(b) by 172 days.

(21) Appl. No.: 17/049,386

(22) PCT Filed: May 7, 2019

(86) PCT No.: PCT/EP2019/061689
§ 371 (c)(1),
(2) Date: Oct. 21, 2020

(87) PCT Pub. No.: WO2019/215156
PCT Pub. Date: Nov. 14, 2019

(65) Prior Publication Data
US 2021/0253839 A1    Aug. 19, 2021

(30) Foreign Application Priority Data

May 9, 2018    (EP) ...................................... 18171561

(51) Int. Cl.
*C08L 23/14*    (2006.01)
(52) U.S. Cl.
CPC ......... *C08L 23/142* (2013.01); *C08L 2203/10* (2013.01); *C08L 2205/025* (2013.01); *C08L 2207/02* (2013.01); *C08L 2314/06* (2013.01)
(58) Field of Classification Search
CPC ........ C08L 23/12; C08L 23/14; C08L 23/142; C08L 23/04; C08L 23/06; C08L 23/08; C08L 23/0807; C08L 23/0815; C08L 23/16
See application file for complete search history.

(56) References Cited

U.S. PATENT DOCUMENTS

| | | | | |
|---|---|---|---|---|
| 2009/0165847 | A1* | 7/2009 | Mori ................... | H01L 31/0481 525/240 |
| 2013/0203908 | A1* | 8/2013 | Kock ....................... | C08L 23/06 524/451 |
| 2013/0337211 | A1* | 12/2013 | Andriolo ............. | B29C 48/0017 264/540 |
| 2017/0145199 | A1* | 5/2017 | Wang ....................... | C08F 10/06 |
| 2017/0183144 | A1* | 6/2017 | Bougie .................... | B65D 83/08 |
| 2017/0313867 | A1* | 11/2017 | Lampela ................. | C08L 23/16 |
| 2021/0309844 | A1* | 10/2021 | Gahleitner ............. | C08F 2/001 |

FOREIGN PATENT DOCUMENTS

| | | |
|---|---|---|
| CN | 105637028 A | 6/2016 |
| CN | 105793299 A | 7/2016 |
| CN | 106459276 A | 2/2017 |
| CN | 107250177 A | 10/2017 |
| CN | 107787347 A | 3/2018 |
| EP | 2865713 A1 | 4/2015 |
| EP | 3064548 A1 | 9/2016 |
| WO | 0192406 A1 | 12/2001 |
| WO | 2006018812 A1 | 2/2006 |
| WO | 2006114357 A1 | 11/2006 |
| WO | 2012084768 A1 | 6/2012 |
| WO | 2013007650 A1 | 1/2013 |
| WO | 2015011135 A1 | 1/2015 |
| WO | 20150150467 A1 | 10/2015 |
| WO | 2016139163 A1 | 9/2016 |
| WO | 2017005667 A1 | 1/2017 |

OTHER PUBLICATIONS

Applicant: Borealis AG; Heterophasic Polypropylene with Propylene Hexene Random Copolymner as Matrix; Chinese Application No. 201980026857.1; Chinese Office Action; dated Jul. 29, 2002; 22 pgs.
Applicant: Borealis AG; European Patent Application No. 18171561.6; Extended European Search Report dated Sep. 25, 2018; 10 pgs.
H. N. Cheng; "Carbon-13 NMR analysis of ethylene-propylene rubbers"; Macromolecules May 31, 1983 17 (10), DOI: 10.1021/ma00140a012; 6 Pgs.
Title 21—Food and Drugs Chapter I—Food an Ddrug Administration Department of Health and Human Services; CFR—Code of Federal Regulations Title 21; Title 21, vol. 3; Revised as of Apr. 1, 2014; 6 pgs.
Busico, V., et al.; "Alk-1-ene Polymerization in the Presence of a Monocyclopentadienyl Zirconium(IV) Acetamidinate Catalyst: Microstructural and Mechanistic Insights"; Macromolecular Rapid Communications; vol. 28, Issue10; May 16, 2007; https://doi.org/10.1002/marc.200700098; 7 pgs.

(Continued)

*Primary Examiner* — Jeffrey C Mullis
(74) *Attorney, Agent, or Firm* — TAROLLI, SUNDHEIM, COVELL & TUMMINO L.L.P.

(57) ABSTRACT

The present invention is directed to a heterophasic polypropylene composition with improved sterilization resistance and optical properties for blow molding applications, in particular for use in the blow-fill-seal process for preparing bottles. The present invention is further directed to a process for producing such a polypropylene composition using a single-site catalyst and to a container produced from such a polypropylene composition by blow molding, like a bottle, in particular a blow-fill-seal bottle, with improved haze before and after sterilization. The polypropylene composition comprises a blend of a propylene copolymer comprising 2.5 to 12.0 wt % of 1-hexene as a comonomer, and having a melt flow rate $MFR_2$ of 0.5 to 20.0 g/10 min, and an ethylene homo- or copolymer having a melt flow rate $MFR_2$ of 0.05 to 30.0 g/10 min and a density of 850 to 940 kg/m$^3$, wherein the xylene cold solubles (XCS) content of the polypropylene composition is from 5.0 to 30.0 wt %.

13 Claims, No Drawings

(56) References Cited

OTHER PUBLICATIONS

Patrice Castignolles, et al.; "Detection and quantification of branching in polyacrylates by size-exclusion chromatography (SEC) and melt-state 13C NMR spectroscopy"; Polymer 50; journal homepage: www.elsevier.com/locate/polymer; Mar. 24, 2009; 11 pgs.

Xenia Filip, et al.; "Heteronuclear decoupling under fast MAS by a rotor-synchronized Hahn-echo pulse train"; Communication; Journal of Magnetic Resonance; Elsevier; Jul. 21, 2005; 5 pgs.

Gurmeet Singh, et al.; "Triad sequence determination of ethylene-propylene copolymers—application of quantitative 13C NMR"; Polymer Testing journal homepage: www.elsevier.com/locate/polytest; Elsevier ScienceDirect; Feb. 27, 2009; 5 pgs.

John M. Griffin, et al.; "Low-load rotor-synchronised Hahn-echo pulse train (RS-HEPT) 1H decoupling in solid-state NMR: factors affecting MAS spin-echo dephasing times"; Magnetic Resonance in Chemictry; Magn. Reson. Chem. 2007; 45: S198-S208; Published online in Wiley InterScience (www.interscience.wiley.com) DOI: 10.1002/mrc.2145; Oct. 16, 2007; 11 pgs.

Material Data Center; Aspects of Plastic Additives Related to Health, Safety and Environment; Tradenames and Suppliers; M-Base Engineering + Software GmbH; www.materialdatacenter.com; Jan. 28, 2021; 26 pgs.

Katja Klimke, et al.; "Optimisation and Application of Polyolefin Branch Quantification by Melt-State 13C NMR Spectroscopy"; Macromolecular Chemistry and Physics; DOI:10.1002/macp. 200500422; Dec. 1, 2005; 14 pgs.

Matthew Parkinson, et al.; "Effect of Branch Length on 13C NMR Relaxation Properties in Molten Poly[ethyleneco-(a-olefin)] Model Systems"; Macromolecular Chemistry and Physics; InterScience; vol. 208, Issue19-20; DOI: 10.1002/macp.200700209; Oct. 24, 2007; 6 pgs.

Dr. Hans Zweifel; Plastics Additives Handbook 5th Edition; Hanser Gardner Publications, Inc.; ISBN-10 : 156990295X; ISBN-13 : 978-1569902950; Jan. 1, 2001; 7 pgs.

M. Pollard; et al.,; "Observation of Chain Branching in Polyethylene in the Solid State and Melt via 13C NMR Spectroscopy and Melt NMR Relaxation Time Measurements"; Macromolecules 2004, 37, Sep. 17, 2003; 13 pgs.

Luigi Resconi, et al.; "Selectivity in Propene Polymerization with Metallocene Catalysts"; Chem. Rev. 2000, 100, Sep. 16, 1999; 94 pgs.

Wen-Jun Wang and Shiping Zhu; "Structural Analysis of Ethylene/Propylene Copolymers Synthesized with a Constrained Geometry Catalyst"; Macromolecules 2000, 33; Dec. 9, 1999; 6 pgs.

Zhe Zhou, et al.; "A new decoupling method for accurate quantification of polyethylene copolymer composition and triad sequence distribution with 13C NMR"; Journal of Magnetic Rsonance 197 (2007); www.sciencedirect.com; Elsevier; May 23, 2007; 9 pgs.

\* cited by examiner

HETEROPHASIC POLYPROPYLENE WITH PROPYLENE HEXENE RANDOM COPOLYMER AS MATRIX

The present invention is directed to a heterophasic polypropylene composition with improved sterilization resistance and optical properties for blow molding applications, in particular for use in the blow-fill-seal process for preparing bottles. The present invention is further directed to a process for producing such a polypropylene composition and to a container produced from such a polypropylene composition by blow molding, like a bottle, in particular a blow-fill-seal bottle.

The blow-fill-seal (BFS) process technology is a manufacturing technique used to produce liquid-filled containers and is well known in the art. In the past it has become more prevalent within the pharmaceutical industry and is now widely considered to be the superior form of aseptic processing by various medicine regulatory agencies including the U.S. Food and Drug Administration (FDA) in the packaging of pharmaceutical and healthcare products. The basic concept of BFS is that a container is formed, filled, and sealed in a continuous process without human intervention, in a sterile enclosed area inside a machine. Thus this technology can be used to aseptically manufacture sterile pharmaceutical liquid dosage forms.

The process is based on the following steps. First, a pharmaceutical-grade polymer resin is vertically heat extruded through a circular throat to form a hanging tube called the parison. This extruded tube is then enclosed within a two-part mould, and the tube is cut above the mould. The mould is transferred to the filling zone, or sterile filling space, where filling needles (mandrels) are lowered and used to inflate the polymer to form the container within the mould. Following the formation of the container, the mandrel is used to fill the container with liquid. Following filling the mandrels are retracted and a secondary top mould seals the container. All actions take place inside a sterile shrouded chamber inside the machine. The product is then discharged to a non-sterile area for labeling, packaging and distribution.

Blow-fill-seal technology reduces personnel intervention making it a more robust method for the aseptic preparation of sterile pharmaceuticals. BFS is used for the filling of vials for parenteral preparations and infusions, eye drops, and inhalation products.

Blow-fill-seal containers, or in particular bottles, are mainly made up of polyethylene, in particular of low density polyethylene (LDPE) due to its excellent processability, good transparency, good softness for collapsible bottles in combination with the highest possible purity since no catalyst residues are present and not many additives are normally required.

A disadvantage of LDPE is its low melting temperature ($T_m$). Since for some applications in the field of medical devices sterilization is necessary, the comparably low $T_m$ limits the steam sterilization to a temperature significantly below said melting temperatures. Accordingly, lower sterilization temperature is applied and the whole sterilization process takes much longer time. Further on, the optical properties are worse after sterilization due to post-crystallization and surface roughening.

There are also solutions based on polypropylene, in particular heterophasic materials with a random propylene copolymer matrix prepared by single site catalysts (SSC), since these materials provide good optical properties and very low extractables. However, there are two main drawbacks of such SSC-based materials. Due to the excellent comonomer insertion and chain defects, the $T_m$ of such SSC-based heterophasic polypropylenes is rather low. Such low melting temperatures limit the processing window for sterilisation processes, especially for steam sterilisation processes. Accordingly—as described for the case of LDPE—when the temperature for sterilisation cannot be increased, the time required for proper sterilisation needs to be extended. Longer sterilisation time, however, requires more energy and can induce additional unwanted ageing and post-crystallization effects on the polymer. Further on, the narrow molecular weight distribution (MWD) of such materials limits the processing window.

Hence, there is still a need of a polyolefin composition with improved sterilization resistance and optical properties for blow molding applications, in particular for use in the blow-fill-seal process for preparing bottles, having acceptable processability, mechanical properties and purity.

WO 01/92406 A1 discloses a propylene polymer composition for extrusion blow molding of bottles produced with a Ziegler-Natta catalyst, having improved impact strength and excellent optical properties, wherein the propylene polymer composition comprises 70 to 90 wt % of a random copolymer of propylene with ethylene, containing from 1 to 6 wt % of ethylene, having a content of fraction insoluble in xylene at room temperature of not less than 93%, and from 10 to 30 wt % of a copolymer of propylene with ethylene, containing from 8 to 18 wt % of ethylene, having a melt flow rate $MFR_2$ (230° C., 2.16 kg) of from 0.5 to 50 g/10 min.

WO 2006/018812 A1 discloses a stretch blow molded container comprising a propylene polymer composition produced with a metallocene catalyst, having good processability and an improved balance of transparency and mechanical properties, wherein the propylene polymer composition comprises 25.0 to 75.0 wt % of a homopolymer or minirandom copolymer of propylene containing up to 1.0 wt % of at least one of ethylene and $C_4$-$C_{10}$ α-olefins, having an isotactic index greater than about 80%, and 25.0 to 75.0 wt % of a random copolymer of propylene and at least one olefin chosen from ethylene and $C_4$-$C_{10}$ α-olefins, containing about 0.3 to about 30 wt % of said olefin, and having an isotactic index greater than about 60%, wherein the propylene polymer composition has a melt flow rate of from 1 to 50 g/10 min and a molecular weight distribution of less than 3.5.

WO 2006/114357 A1 discloses a propylene polymer composition for thermoforming produced with a Ziegler-Natta catalyst, achieving articles having good mechanical and optical properties, wherein the propylene polymer composition comprises 60 to 90 wt % of a copolymer of propylene with ethylene containing less than 2.5 wt % of ethylene units, and 10 to 40 wt % of a copolymer of propylene comprising from 15 to 35 wt % of ethylene units, wherein the polymer composition has a melt flow rate value according to ISO 1133 (230° C., 2.16 kg) of less than 10 g/10 min.

WO 2012/084768 A1 discloses a propylene polymer composition for blow molding produced with a metallocene catalyst, wherein the blow molded articles, in particular collapsible bottles, can be sterilized at a temperature of 121° C., have low amount of extractables, and have good clarity without addition of nucleating or clarifying additives, wherein the propylene polymer composition comprises 60 to 90 wt % of a crystalline propylene copolymer containing from 1.0 to 5.0 wt % of ethylene derived units, and 10 to 40 wt % of a copolymer of propylene with from 18 to 32 wt % of ethylene derived units, wherein the propylene polymer composition has a melt flow rate value according to ISO 1133 (230° C., 2.16 kg) of from 1.0 to 2.0 g/10 min.

The solutions according to the prior art are still not sufficient to fulfill the needs addressed above.

It is therefore an object of the present invention to provide a polypropylene composition with improved sterilization resistance and optical properties for blow molding applications, in particular for use in the blow-fill-seal process for preparing bottles.

The present invention is based on the finding that the object can be solved by provision of a heterophasic polypropylene composition comprising a blend of a propylene 1-hexene random copolymer as matrix and of a further polyolefin comprising ethylene monomer units.

The present invention is accordingly in one aspect directed to a polypropylene composition comprising a blend of
(a) a propylene copolymer comprising 2.5 to 12.0 wt %, based on the weight of the propylene copolymer, of 1-hexene as a comonomer, and having a melt flow rate $MFR_2$ of 0.5 to 20.0 g/10 min, and
(b) an ethylene homo- or copolymer having a melt flow rate $MFR_2$ of 0.05 to 30.0 g/10 min and a density of 850 to 940 kg/m³,
wherein the xylene cold solubles (XCS) content of the polypropylene composition is from 5.0 to 30.0 wt %.

The polypropylene composition according to the present invention has sufficient sterilization resistance (sufficiently high melting temperature) and optical properties (low haze of bottles before and after sterilization) and is accordingly perfectly applicable for blow molding applications, in particular for use in the blow-fill-seal process for preparing bottles.

Polypropylene Composition

Given the nature of components (a) and (b) of the blend of the polypropylene composition described above, the propylene copolymer (a) is a crystalline matrix with component (b) dispersed therein. The polypropylene composition according to the present invention is accordingly a heterophasic polypropylene composition.

According to a preferred embodiment of the polypropylene composition of the present invention, the blend comprises 70.0 to 95.0 wt %, based on the weight of the blend, of the propylene copolymer (a), and 5.0 to 30.0 wt %, based on the weight of the blend, of the ethylene homo- or copolymer (b).

The amount of the propylene copolymer (a) is accordingly preferably 70.0 to 95.0 wt %, based on the weight of the blend, more preferably 73.0 to 93.0 wt %, like 75.0 to 92.0 wt %.

The amount of the ethylene homo- or copolymer (b) is accordingly preferably 5.0 to 30.0 wt %, based on the weight of the blend, more preferably 7.0 to 27.0 wt %, like 8.0 to 25.0 wt %.

As indicated above, the xylene cold solubles (XCS) content of the polypropylene composition is from 5.0 to 30.0 wt %, preferably from 6.5 to 27.5 wt %, more preferably from 8.0 to 25.0 wt %, like 8.0 to 15.0 wt % or 15.0 to 25.0 wt %.

The melt flow rate $MFR_2$ of the polypropylene composition of the present invention is preferably from 1.0 to 12.0 g/10 min (230° C., 2.16 kg), more preferably from 1.0 to 10.0 g/10 min, still more preferably from 1.1 to 8.0 g/10 min.

The melting temperature $T_m$ of the polypropylene composition is preferably at least 120° C., more preferably at least 130° C., still more preferably at least 132° C. The melting temperature will be usually not higher than 150° C., like not higher than 148° C.

The crystallization temperature $T_c$ of the polypropylene composition according to the present invention is preferable below 100° C., more preferably at least 80° C. to below 100° C., still more preferably 85 to 95° C.

The content of 1-hexene of the polypropylene composition according to the present invention is preferably 2.0 to 7.0 wt %, more preferably 2.5 to 6.5 wt %, still more preferably 3.0 to 6.0 wt %.

The ethylene content of the polypropylene composition according to the present invention is preferably 0.5 to 40.0 wt %, more preferably 0.8 to 35.0 wt %, still more preferably 1.0 to 30.0 wt %.

The intrinsic viscosity of the XCS fraction of the polypropylene composition according to the present invention is preferably less than 5.0 dl/g.

The content of hexane extractables according to FDA of the polypropylene composition according to the present invention is preferably below 1.5 wt %, more preferably 0.3 to 1.4 wt %.

The flexural modulus of the polypropylene composition according to the present invention is preferably below 700 MPa, more preferably 450 to 650 MPa, still more preferably 500 to 630 MPa.

The haze of the polypropylene composition of the present invention is preferably lower than 40.0%, more preferably lower than 35.0%.

Preferably, the blend makes up at least 90.0 wt %, more preferably at least 95.0 wt %, like 98.0 wt % or 100 wt %, of the polypropylene composition of the present invention.

The polypropylene composition according to the present invention may optionally comprise from 0.001 to 0.50 wt % of an α-nucleating agent. Such α-nucleating agents are commercially available and are described, for example, in "Plastic Additives Handbook", 5th edition, 2001 of Hans Zweifel (pages 949 to 964).

The polypropylene composition according to the present invention may optionally comprise usual additives in an amount of below 10.0 wt %, like below 5.0 wt %. Additives are suitably selected from the group of primary antioxidants like sterically hindered phenols and secondary antioxidants like phosphites, UV stabilizers like sterically hindered amines, acid scavengers, carbon black, pigment, antistatic agents like glycerol monostearate, slip agents like oleamide, plasticizers, anti-scratch agents, dispersing agents, processing aids, lubricants, and the like.

Such additives are commercially available and for example described in "Plastic Additives Handbook", 6th edition 2009 of Hans Zweifel (pages 1141 to 1190) and typically used in conventional amounts.

In case present, the α-nucleating agent and/or any of the usual additives may be comprised in the propylene copolymer (a) and/or in the ethylene homo- or copolymer (b), or may be added in the step of compounding for obtaining the polypropylene composition.

In case any α-nucleating agent and/or any of the usual additives is added in the step of compounding, the addition of the α-nucleating agent and/or any of the usual additives is usually carried out in the form of a masterbatch, i.e. the α-nucleating agent and/or any of the usual additives is contained in a suitable polyolefin carrier, e.g. polyethylene or polypropylene, in high concentration. The propylene copolymer (a), the ethylene homo- or copolymer (b), and optionally one or more masterbatches containing a α-nucleating agent and/or one or more usual additives are compounded to obtain the polypropylene composition.

Propylene Copolymer (a)

The propylene copolymer (a) comprises 2.5 to 12.0 wt %, preferably 2.8 to 8.0 wt %, more preferably 3.0 to 6.5 wt %, based on the weight of the propylene copolymer (a), of 1-hexene as a comonomer.

The propylene copolymer (a) may optionally in addition comprise 0.1 to 3.0 wt %, based on the weight of the propylene copolymer (a), of ethylene as a comonomer.

The propylene copolymer (a) has a melt flow rate $MFR_2$ of 0.5 to 20.0 g/10 min (230° C., 2.16 kg), like 0.5 to 15.0 g/10 min or 0.5 to 10.0 g/10 min.

The skilled person knows how to produce a propylene copolymer (a) according to the present invention, i.e. a propylene 1-hexene copolymer or a propylene 1-hexene ethylene terpolymer, or a reactor blend of a propylene 1-hexene copolymer and a propylene ethylene copolymer.

Polymerization may be carried out for example in a loop reactor, in a pas phase reactor or in a combination of both, in the presence of a suitable catalyst like a Ziegler-Natta catalyst or a single site catalyst, e.g. a metallocene catalyst.

The propylene copolymer (a) may comprise two propylene copolymer fractions produced in two different polymerization steps, wherein the first fraction has a lower melt flow rate $MFR_2$ than the second fraction, and wherein the polymerization step for obtaining the second fraction is carried out in the presence of the first fraction. Hence, the melt flow rate $MFR_2$ of the product obtained from the polymerization step for obtaining the second fraction, containing also the first fraction, has a higher melt flow rate $MFR_2$ than the first fraction. The melt flow rate $MFR_2$ of the first fraction is usually 0.1 to 10.0 g/10 min.

In an embodiment as described above, wherein the propylene copolymer (a) comprises two propylene copolymer fractions produced in two different polymerization steps, it is further preferred that the content of 1-hexene of the first fraction is lower than the content of 1-hexene of the second fraction. The content of 1-hexene of the first fraction is usually 1.0 to 6.0 wt %, like 1.0 to 3.0 wt %. The content of 1-hexene of the second fraction is usually 3.0 to 14.0 wt %, like 3.5 to 12.0 wt %.

It is preferred, that in an embodiment as described above, wherein the propylene copolymer (a) comprises two propylene copolymer fractions produced in two different polymerization steps, the first fraction has a lower melt flow rate $MFR_2$ and has a lower content of 1-hexene than the second fraction. In this regard it is further preferred that the first fraction is polymerized in a loop reactor, while the second fraction is polymerized in a gas phase reactor in the presence of the product obtained from the loop reactor, i.e. the first fraction.

In an embodiment as described above, wherein the propylene copolymer (a) comprises two propylene copolymer fractions produced in two different polymerization steps, the split between the two reactors is usually 30.0 to 70.0 wt % for the first fraction, preferably prepared in a loop reactor, and accordingly correspondingly 70.0 to 30.0 wt % for the second fraction, preferably prepared in a gas phase reactor.

The use of a single site catalyst is preferred. The single-site catalyst is preferably a metallocene catalyst with the metal being Zr or Hf, and the ligand being based on two 4-phenylindene moieties being linked by the moiety —$SiR_2$—, wherein each R is independently a $C_1$-$C_{20}$-hydrocarbyl group or tri($C_1$-$C_{20}$-alkyl)silyl.

Ethylene Homo- or Copolymer (b)

The term "ethylene homo- or copolymer" as used herein denotes, and accordingly the ethylene homo- or copolymer (b) according to the present invention is, a polyolefin comprising ethylene monomer units.

Hence, in case the ethylene homo- or copolymer (b) is a homopolymer, it is an ethylene homopolymer.

In case the ethylene homo- or copolymer (b) is a copolymer, it is a copolymer comprising ethylene monomer units and further monomer units derived from an α-olefin.

The ethylene homo- or copolymer has a melt flow rate $MFR_2$ of 0.05 to 30.0 g/10 min (190° C., 2.16 kg), preferably 0.1 to 25.0 g/10 min, like 0.2 to 20.0 g/10 min.

The ethylene homo- or copolymer has a density of 850 to 940 kg/m$^3$, preferably of 855 to 935 kg/m$^3$, like 860 to 932 kg/m$^3$.

Given the density range defined above, in case the ethylene homo- or copolymer (b) is an ethylene homopolymer, it is a so-called low density polyethylene, LDPE. The skilled person knows how to produce such LDPE in a high pressure process without applying a catalyst. Suitable LDPE grades are also commercially available. A low density polyethylene usually has a density of 910 to 940 kg/m$^3$ and according to the present invention preferably has a density of 915 to 935 kg/m$^3$.

In case the ethylene homo- or copolymer (b) is an ethylene copolymer, i.e. it is a copolymer comprising ethylene monomer units and further monomer units derived from an α-olefin, it is preferably a copolymer of ethylene and a $C_3$ to $C_{12}$ α-olefin, more preferably the α-olefin is propylene.

The skilled person knows how to produce such copolymers. Polymerization may be carried out for example in a loop reactor, in a pas phase reactor or in a combination of both, in the presence of a suitable catalyst like a Ziegler-Natta catalyst or a single site catalyst, e.g. a metallocene catalyst. Such a copolymer usually has a density of 850 to 900 kg/m$^3$, preferably of 855 to 895 kg/m$^3$.

A particular preferred copolymer comprising ethylene monomer units according to the present invention is a copolymer comprising, more preferably consisting of, ethylene and propylene monomer units.

It is also particularly preferred according to the present invention that the copolymer comprising ethylene monomer units and further monomer units derived from an α-olefin comprises less than 25.0 wt % of ethylene.

It is also particularly preferred according to the present invention that the copolymer comprising ethylene monomer units and further monomer units derived from an α-olefin comprises less than 25.0 wt % of ethylene, the remainder being propylene.

Hence, according to a particular preferred embodiment of the present invention the ethylene homo- or copolymer (b) is an ethylene propylene copolymer comprising less than 25.0 wt % of ethylene, i.e. a copolymer of propylene and less than 25.0 wt % of ethylene.

The ethylene content will be usually at least 6.0 wt %.

Hence, according to a further particular preferred embodiment of the present invention the ethylene homo- or copolymer (b) is an ethylene propylene copolymer comprising 6.0 to 25.0 wt % of ethylene, i.e. a copolymer of propylene and 6.0 to 25.0 wt % of ethylene, more preferably the ethylene propylene copolymer consists of propylene and 6.0 to 25.0 wt % ethylene monomer units.

Container and Bottle

The present invention is in a further aspect directed to a container comprising, more preferably comprising at least 80.0 wt %, yet more preferably comprising at least 95.0 wt %, still more preferably consisting of, the polypropylene composition according to the present invention as described above, including all preferred embodiments thereof.

Preferably, the container is produced from the polypropylene composition by blow molding, more preferably by a blow-fill-seal process. These processes are known to the skilled person.

The container is preferably a bottle.

In the embodiment wherein the container is a bottle it is furthermore preferred that the haze of the bottle is below 15.0% before sterilization. In the embodiment wherein the container is a bottle it is furthermore preferred that the haze of the bottle is below 20.0% after sterilization of the bottle at 121° C. for 30 minutes.

In this regard it is particularly preferred that the haze of the bottle is below 15.0% before sterilization and that the haze of the bottle is below 20.0% after sterilization of the bottle at 121° C. for 30 minutes.

In the embodiment wherein the container is a bottle it is furthermore preferred that the clarity of the bottle is higher than 50.0% before sterilization. In the embodiment wherein the container is a bottle it is furthermore preferred that the clarity of the bottle is higher than 50.0% after sterilization of the bottle at 121° C. for 30 minutes.

In this regard it is particularly preferred that the clarity of the bottle is higher than 50.0% before sterilization and that the clarity of the bottle is higher than 50.0% after sterilization of the bottle at 121° C. for 30 minutes.

Process for Producing the Polypropylene Composition

The present invention is in a further aspect directed to a process for preparing a polypropylene composition according to the present invention as described above, including all preferred embodiments thereof, comprising the following steps:
(i) polymerising propylene and 1-hexene, and optionally ethylene, in the presence of a single-site catalyst to obtain a fraction (a) having a content of 1-hexene of 2.5 to 12.0 wt %, and optionally a content of ethylene of 0.1 to 3.0 wt %, and having a melt flow rate $MFR_2$ of 0.5 to 20.0 g/10 min (230° C., 2.16 kg), and
(ii) polymerising ethylene, or ethylene and a $C_3$ to $C_{12}$ α-olefin, to obtain a fraction (b) having a melt flow rate $MFR_2$ of 0.05 to 30.0 g/10 min (190° C., 2.16 kg) and a density of 850 to 940 kg/m$^3$.

The single-site catalyst is preferably a metallocene catalyst with the metal being Zr or Hf, and the ligand being based on two 4-phenylindene moieties being linked by the moiety —SiR2-, wherein each R is independently a C1-C20-hydrocarbyl group or tri(C1-C20-alkyl)silyl.

The polypropylene composition according to the present invention can be a reactor blend or can be blended by compounding.

Accordingly, in one embodiment, the polymerization step (ii) is carried out in the presence of fraction (a). In this embodiment the catalyst used for the polymerization step (i) is also used for the polymerization step (ii) without addition of extra catalyst. The obtained reactor blend contains an intimate mixture of the product of the polymerization step (i) and of the product of the polymerization step (ii), i.e. of fractions (a) and (b). In this embodiment it is particularly preferred that in the polymerization step (ii) ethylene and a $C_3$ to $C_{12}$ α-olefin is reacted, more preferably ethylene and propylene, still more preferably the product of the polymerization step (ii), i.e. fraction (b), contains less than 25.0 wt % ethylene, like 5.0 to 22.0 wt % or 6.0 to 20.0 wt % ethylene.

In another embodiment the polymerization step (i) is carried out in the absence of fraction (b) and the polymerization step (ii) is carried out in the absence of fraction (a), and fraction (a) and fraction (b) are mixed by compounding to obtain the blend. In this embodiment it is particularly preferred that in the polymerization step (ii) ethylene is reacted to obtain an ethylene homopolymer, more preferably that ethylene is reacted in a high pressure process without catalyst to obtain a low density polyethylene (LDPE).

In the following the present invention is further illustrated by means of examples.

EXAMPLES

1. Definitions/Measuring Methods

The following definitions of terms and determination methods apply for the above general description of the invention as well as to the below examples unless otherwise defined.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene (polypropylene composition of the present invention and propylene copolymer (a)) is determined at a temperature of 230° C. and a load of 2.16 kg. The $MFR_2$ of polyethylene (ethylene homo- or copolymer (b)) is determined at a temperature of 190° C. and a load of 2.16 kg.

Comonomer Content (Ethylene)

Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C$ {$^1H$}NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents.

Comonomer Content (1-Hexene)

Quantitative $^{13}C$ {$^1H$} NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, 51, S198). A total of 16384 (16k) transients were acquired per spectra.

Quantitative $^{13}C$ {$^1H$} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$H = I\alpha B4/2$

The amount of 1-hexene incorporated in PHHP double consecutive sequences was quantified using the integral of the ααB4 site at 41.7 ppm accounting for the number of reporting sites per comonomer:

$HH = 2*I\alpha\alpha B4$

When double consecutive incorporation was observed the amount of 1-hexene incorporated in PHP isolated sequences needed to be compensated due to the overlap of the signals αB4 and αB4B4 at 44.4 ppm:

$H = (I\alpha B4 - 2*I\alpha\alpha B4)/2$

The total 1-hexene content was calculated based on the sum of isolated and consecutively incorporated 1-hexene:

$H_{total} = H + HH$

When no sites indicative of consecutive incorporation observed the total 1-hexeen comonomer content was calculated solely on this quantity:

$H_{total} = H$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$P21 = I\alpha\alpha 21e9$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$P12 = I_S\alpha\alpha + 2*P21 + H + HH/2$

The total amount of propene was quantified as the sum of primary (1,2) and secondary (2,1-erythro) inserted propene:

$P_{total} = P12 + P21 = I_S\alpha\alpha + 3*I\alpha\alpha 21e9 + (I\alpha B4 - 2*I\alpha\alpha B4)/2 + I\alpha\alpha B4$ This simplifies to:

$P_{total} = I_S\alpha\alpha + 3*I\alpha\alpha 21e9 + 0.5*I\alpha B4$

The total mole fraction of 1-hexene in the polymer was then calculated as:

$fH = H_{total}/(H_{total} + P_{total})$

The full integral equation for the mole fraction of 1-hexene in the polymer was:

$fH = (((I\alpha B4 - 2*I\alpha\alpha B4)/2) + (2*I\alpha\alpha B4))I_S\alpha\alpha + 3*I\alpha\alpha 21e9 + 0.5*I\alpha B4) + ((I\alpha B4 - 2*I\alpha\alpha B4)/2) + (2*I\alpha\alpha B4))$ This simplifies to:

$fH = (I\alpha B4/2 + I\alpha\alpha B4)/(I_S\alpha\alpha + 3*I\alpha\alpha 21e9 + I\alpha B4 + I\alpha\alpha B4)$ The total comonomer incorporation of 1-hexene in mole percent was calculated from the mole fraction in the usual manner:

$H[mol\%] = 100*fH$

The total comonomer incorporation of 1-hexene in weight percent was calculated from the mole fraction in the standard manner:

$H[wt\%] = 100*(fH*84.16)/((fH*84.16) + ((1-fH)*42.08))$

Density

Density is measured according to ISO 1183-187. Sample preparation is done by compression moulding in accordance with ISO 1872-2:2007.

Differential Scanning Calorimetry (DSC)

Differential scanning calorimetry (DSC) analysis, melting temperature ($T_m$) and melt enthalpy ($H_m$), crystallization temperature (TO, and heat of crystallization ($H_e$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_a$) and heat of crystallization ($H_c$) are determined from the cooling step, while melting temperature ($T_m$) and melt enthalpy ($H_m$) are determined from the second heating step.

Xylene Cold Soluble (XCS) Content

Xylene Cold Soluble fraction at room temperature (XCS, wt %) is determined at 25° C. according to ISO 16152; 5th edition; 2005-07-01.

Intrinsic Viscosity

Intrinsic viscosity is measured according to DIN ISO 1628/1, October 1999 (in Decalin at 135° C.).

Hexane Soluble Fraction (C6 FDA)

The amount of hexane extractable polymer according to FDA method (federal registration, title 21, Chapter 1, part 177, section 1520, s. Annex B) was determined from films produced on a PM30 cast film extrusion line with about 220° C. melt temperature with L/D=20 and a screw diameter of 30 mm (feed zone 4 D long, 5.8 mm deep, compression zone 10 D long, metering zone 6 D long, 2.3 mm deep utilising a screen pack 36-400-900-400 mesh/cm$^2$). A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 μm. The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.

Steam Sterilisation

Steam sterilisation was performed in a Systec D series machine (Systec Inc., USA). The samples were heated up at a heating rate of 5° C./min starting from 23° C. After having been kept for 30 min at 121° C., they were removed immediately from the steam steriliser and stored at room temperature till processed further.

Flexural Modulus

The flexural modulus was determined in 3-point-bending at 23° C. according to ISO 178 on 80×10×4 mm$^3$ test bars injection moulded in line with EN ISO 1873-2.

Notched Impact Strength (NIS)

The Charpy notched impact strength (NIS) was measured according to ISO 179 1eA at +23° C., using injection moulded bar test specimens of 80×10×4 mm$^3$ prepared in accordance with EN ISO 1873-2.

Haze

Haze was determined according to ASTM D1003-00 on 60×60×1 mm$^3$ plaques injection moulded in line with EN ISO 1873-2. Hence, haze is determined on 1 mm thick plaques.

Clarity and Haze Measurement on 0.3 mm Thick EBM Bottles

Clarity and haze of bottles were determined according to ASTM D1003. The measurement is done on the outer wall of the bottles. The top and bottom of the bottles are cut off. The resulting round wall is then split in two, horizontally. Then from this wall six equal samples of approximately 60×60 mm are cut from close to the middle. The specimens are placed into the instrument with their convex side facing the haze port. Haze and clarity are measured for each of the six samples. The reported value is the average of these six parallels.

2. Examples

Preparation of the Catalyst System for the Inventive Examples

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Polymerization and Pelletization

Polymerization was performed in a Borstar pilot plant comprising a prepolymerisation reactor, a loop reactor and one or two gas phase reactors. The polymerisation conditions are indicated in Table 1.

Polymer P1 is produced in the above-mentioned pilot plant comprising a prepolymerisation reactor, a loop reactor and two gas phase reactors. P1 is the basis of Inventive Example 1, 1E1.

Polymer P2 is produced in the above-mentioned pilot plant comprising a prepolymerisation reactor, a loop reactor and a phase reactor. P2 is the basis of Inventive Examples 2 and 3, 1E2 and IE3.

Both polymers P1 and P2 were compounded in a co-rotating twin-screw extruder Coperion ZSK 57 at 220° C. with 0.2 wt % of Irganox B225 (1:1-blend of Irganox 1010 (Pentaerythrityl-5 tetrakis(3-(3',5'-di-tert.butyl-4-hydroxy-toluyl)-propionate and tris (2,4-di-t-butylphenyl) phosphate) phosphite) of BASF AG, Germany) and 0.1 wt % calcium stearate followed by solidification of the resulting melt strands in a water bath and pelletization.

Compounding

All further melt mixing was performed in a Thermo Fisher (PRISM) TSE 24 twin-screw extruder at 220° C. followed by solidification of the resulting melt strands in a water bath and pelletization.

The polypropylene composition of IE2 is obtained by mixing P2 with 10 wt % of Vistamaxx™ 6202, a propylene ethylene random copolymer commercially available from ExxonMobil having an ethylene content of 15 wt %, a density of 862 kg/m$^3$, and a melt index at 190° C. with a load of 2.16 kg (ASTM D1238) of 9.1 g/10 min.

The polypropylene composition of IE3 is obtained by mixing P2 with 10 wt % of LE6609-PH, a low-density polyethylene commercially available from *Borealis* AG, Austria, having a density (ISO 1183) of 930 kg/m$^3$, and a melt flow rate at 190° C. with a load of 2.16 kg (ISO 1133) of 0.3 g/10 min.

CE1 is a comparative heterophasic propylene copolymer based on a Ziegler-Natta type catalyst (ZNC) as described in WO 2017/005667 A1, IE1.

CE2 is the commercial grade LE6609-PH available from Borealis AG, Austria and is a low density polyethylene (LDPE) having a density of 930 kg/m$^3$ and an MFR (190° C./2.16 kg) of 0.3 g/10 min.

Preparation of the Bottles

Bottles of 1 litre capacity were produced on a "Fischer

Müller" Blow Moulding Machine.

The main processing parameters for the production were:

Temperature profile: 180 to 200° C. applied in extruder, adapter and head

Melt temperature measured: 190° C.

Speed of extruder (revolution per minute; rpm): 13 to 16 rpm

Die gap for producing 0.6 mm thick bottles was adjusted to get a bottle with a weight of 40 g with the commercial Borealis grade RB307MO (random propylene copolymer with a density of 902 kg/m$^3$ and an MFR$_2$ of 1.5 g/10 min)

Cycle time: 12 to 16 seconds

For producing 0.3 mm thick bottles, the die gap was adjusted to get a bottle with a weight of 25 g with the commercial Borealis grade RB307MO.

The bottles had an outer diameter of 90 mm, wall thickness of 0.3 mm or 0.6 mm respectively, an overall-height of 204 mm and a height of the cylindrical mantle of 185 mm.

The properties of the inventive and comparative examples (compositions and bottles) are listed in Table 2.

TABLE 1

Polymerisation details of polymers P1 and P2

|  |  | P1 | P2 |
|---|---|---|---|
| Prepolymerization |  |  |  |
| Temperature | ° C. | 20 | 20 |
| Pressure | kPa | 5256 | 5023 |
| Residence time | h | 0.4 | 0.5 |
| Loop reactor |  |  |  |
| Temperature | ° C. | 70 | 70 |
| Pressure | kPa | 5280 | 5244 |
| H2/C3 ratio | mol/kmol | 0.1 | 0.1 |
| C6/C3 ratio | mol/kmol | 8.9 | 8.2 |
| Residence time | h | 0.4 | 0.4 |
| C6 | wt % | 1.8 | 1.4 |
| MFR | g/10 min | 2.1 | 1.4 |
| Split | wt % | 38 | 45 |
| Gas phase reactor 1 |  |  |  |
| Temperature | ° C. | 80 | 80 |
| Pressure | kPa | 2500 | 2500 |
| H2/C3 ratio | mol/kmol | 1.4 | 1.5 |
| C6/C3 ratio | mol/kmol | 9.4 | 9.0 |
| Residence time | h | 0.4 | 0.4 |
| MFR(GPR1) | wt % | 0.8 | 1.4 |
| C6(GPR1) | wt % | 11.9 | 7.9 |
| MFR | g/10 min | 1.3 | 1.4 |
| C6 | wt % | 6.9 | 5.0 |
| Split | wt % | 38 | 55 |
| Gas phase reactor 2 |  |  |  |
| Temperature | ° C. | 80 | — |
| Pressure | kPa | 2500 | — |
| H2/C2 ratio | mol/kmol | 2.9 | — |
| C2/C3 ratio | mol/kmol | 300 | — |
| Residence time | h | 0.4 | — |
| Split | % | 24 | — |
| C6 total | wt % | 5.2 | 5.0 |
| C2 total | wt % | 3.5 | 0 |
| XCS | wt % | 23.2 | 11.1 |
| MFR | g/10 min | 1.3 | 1.4 |

TABLE 2

Properties of inventive and comparative examples

|  |  | IE1 | IE2 | IE3 | CE1 | CE2 |
|---|---|---|---|---|---|---|
| MFR | g/10 min | 1.3 | 1.8 | 1.8 | 1.4 | 0.6 |
| T$_m$ | ° C. | 140 | 139 | 136 | 148 | 118 |
| T$_c$ | ° C. | 89 | 91 | 92 | 115 | 104 |
| C6(FDA) | % | 0.91 | n.d. | n.d. | 3.28 | 0.76 |
| XCS | wt % | 23.2 | 19.6 | 10.1 | 21.0 | 0.5 |
| IV(XCS) | dl/g | 2.3 | n.d. | n.d. | 2.3 | n.d. |
| C6 total | wt % | 5.2 | 4.5 | 4.5 | 0 | 0 |
| C2 total | wt % | 3.5 | 1.5 | 10 | 8 | 100 |
| C6(XCS) | wt % | 3.7 | n.d. | n.d. | 0 | 0 |
| C2(XCS) | wt % | 4.7 | n.d. | n.d. | 15.7 | 100 |
| Flexural modulus | MPa | 588 | 535 | 563 | 467 | 331 |
| Charpy NIS 23° C. | kJ/m$^2$ | 7.4 | 6.5 | 6.2 | 76.8 | 72.5 |
| Charpy NIS −20° C. | kJ/m$^2$ | 1.06 | n.d. | n.d. | 1.07 | n.d. |
| Haze 1 mm Bottle (0.3 mm) | % | 30.0 | 29.0 | 26.5 | 28.5 | 48.0 |
| Haze b.s. | % | 13 | 13 | 11 | 32 | 24 |
| Clarity b.s. | % | 67 | 60 | 63 | 62 | 89 |
| Haze a.s. | % | 16 | 14 | 10 | 26 | 33 |
| Clarity a.s. | % | 68 | 61 | 60 | 66 | 86 | a.s.: after sterilization
b.s.: before sterilization

As can be seen from the examples, the propylene copolymer (a) comprising 1-hexene as comonomer is an excellent matrix for making transparent heterophasic polypropylene compositions which have improved sterilization resistance (sufficiently high melting temperature) and optical properties (low haze of bottles before and after sterilization). The polypropylene compositions according to the present invention are accordingly perfectly applicable for blow molding applications, in particular for use in the blow-fill-seal process for preparing bottles.

The invention claimed is:

1. A polypropylene composition comprising a blend of:
   (a) a propylene copolymer comprising 2.5 to 12.0 wt %, based on the weight of the propylene copolymer, of 1-hexene as a comonomer, and having a melt flow rate MFR$_2$ of 0.5 to 20.0 g/10 min, and
   (b) an ethylene homo- or copolymer having a melt flow rate MFR$_2$ of 0.05 to 30.0 g/10 min and a density of 850 to 940 kg/m$^3$, wherein the ethylene copolymer comprised by the ethylene homo- or copolymer (b) is an ethylene propylene copolymer comprising 6.0 to 25.0 wt % of ethylene,
   wherein the xylene cold solubles (XCS) content of the polypropylene composition is from 5.0 to 30.0 wt %, and
   wherein the content of hexane extractables according to FDA of the polypropylene composition is below 1.5 wt %.

2. The polypropylene composition according to claim 1, wherein the blend comprises 70.0 to 95.0 wt %, based on the weight of the blend, of the propylene copolymer (a), and 5.0 to 30.0 wt %, based on the weight of the blend, of the ethylene homo- or copolymer (b).

3. The polypropylene composition according to claim 1, wherein the melting temperature T$_m$ of the polypropylene composition is higher than 120° C.

4. The polypropylene composition according to claim 1, wherein the melt flow rate MFR$_2$ of the polypropylene composition is from 1.0 to 12.0 g/10 min.

5. The polypropylene composition according to claim 1, wherein the propylene copolymer (a) comprises in addition 0.1 to 3.0 wt %, based on the weight of the propylene copolymer, of ethylene as a comonomer.

6. The polypropylene composition according to claim 1, wherein the content of 1-hexene of the polypropylene composition is 2.0 to 7.0 wt %.

7. The polypropylene composition according to claim 1, further comprising from 0.001 to 0.50 wt % of an α-nucleating agent.

8. The polypropylene composition according to claim 1, wherein the propylene copolymer (a) comprises two propylene copolymer fractions produced in two different polymerization steps, wherein the first fraction has a lower melt flow rate $MFR_2$ than the second fraction, and wherein the polymerization step for obtaining the second fraction is carried out in the presence of the first fraction.

9. A process for preparing a polypropylene composition according to claim 1, comprising the following steps:
(i) polymerising propylene and 1-hexene, and optionally ethylene, in the presence of a single-site catalyst to obtain a fraction (a) having a content of 1-hexene of 2.5 to 12.0 wt %, and optionally a content of ethylene of 0.1 to 3.0 wt %, and having a melt flow rate $MFR_2$ of 0.5 to 20.0 g/10 min, and (ii) polymerising ethylene, or ethylene and propylene, to obtain a fraction (b) having a melt flow rate $MFR_2$ of 0.05 to 30.0 g/10 min and a density of 850 to 940 kg/m$^3$.

10. The process according to claim 9, wherein the polymerization step (ii) is carried out in the presence of fraction (a).

11. The process according to claim 9, wherein the polymerization step (i) is carried out in the absence of fraction (b) and the polymerization step (ii) is carried out in the absence of fraction (a), and fraction (a) and fraction (b) are mixed by compounding to obtain the blend.

12. The process according to claim 1, wherein the single-site catalyst is a metallocene catalyst with the metal being Zr or Hf, and the ligand being based on two 4-phenylindene moieties being linked by the moiety —$SiR_2$—, wherein each R is independently a $C_1$-$C_{20}$-hydrocarbyl group or tri($C_1$-$C_{20}$-alkyl)silyl.

13. A container comprising a polypropylene composition according to claim 1, wherein the container is produced from the polypropylene composition by blow molding.

\* \* \* \* \*